United States Patent [19]

O'Neal

[11] Patent Number: 4,945,724

[45] Date of Patent: Aug. 7, 1990

[54] APPARATUS FOR COLLECTING HYDRAULIC LEAKAGE FLUID

[75] Inventor: James I. O'Neal, Batavia, Ohio

[73] Assignee: Cincinnati Milacron Inc., Cincinnati, Ohio

[21] Appl. No.: 301,980

[22] Filed: Jan. 26, 1989

[51] Int. Cl.⁵ .............................................. F16D 31/02
[52] U.S. Cl. .................................... 60/455; 92/86; 92/168; 277/72 R; 277/79; 277/187; 277/205
[58] Field of Search ...................... 60/455, 397; 92/86, 92/165 R, 166, 168; 277/187, 72 R, 79, 78, 71, 70, 205

[56] References Cited

U.S. PATENT DOCUMENTS

| | | | |
|---|---|---|---|
| 980,231 | 1/1911 | Farquhar | 277/79 |
| 1,725,836 | 8/1929 | Solberg . | |
| 2,438,245 | 3/1948 | Gregg | 60/52 |
| 2,526,236 | 10/1950 | Ingres | 60/54.5 |
| 2,680,349 | 6/1954 | Hill et al. | 60/54.5 |
| 2,682,886 | 7/1954 | Paxton | 417/148 X |
| 2,898,867 | 8/1959 | Saalfrank | 92/86 X |
| 3,342,500 | 9/1967 | Knudson | 277/124 |
| 3,529,421 | 9/1970 | Neeley | 60/455 |
| 3,667,222 | 6/1972 | Saari | 92/86 X |
| 3,685,398 | 8/1972 | Little | 92/165 R |
| 3,722,374 | 3/1973 | Densmore | 92/165 R |
| 3,765,690 | 10/1973 | Sievenpiper | 277/121 |
| 3,869,963 | 3/1975 | Schindel | 92/86 |
| 3,972,396 | 8/1976 | Bochnak | 188/312 |
| 4,017,214 | 4/1977 | Smith | 417/9 |
| 4,197,786 | 4/1980 | Pillon | 92/86 |
| 4,328,972 | 5/1982 | Albertson et al. | 277/1 |
| 4,425,838 | 1/1984 | Pippert | 92/86 |
| 4,444,548 | 4/1984 | Andersen et al. | 417/148 X |
| 4,476,772 | 10/1984 | Gorman et al. | 92/168 |
| 4,499,969 | 2/1985 | Toombs | 184/106 |
| 4,630,636 | 12/1986 | Cutcher | 137/315 |
| 4,635,945 | 1/1987 | Beck | 277/124 |
| 4,643,440 | 2/1987 | Massey, Jr. | 277/117 |
| 4,687,212 | 8/1987 | Timpson, Jr. et al. | 277/205 |

FOREIGN PATENT DOCUMENTS

| | | | |
|---|---|---|---|
| 3309622 | 9/1984 | Fed. Rep. of Germany | 92/86 |
| 3502538 | 8/1985 | Fed. Rep. of Germany | 92/86 |
| 955741 | 1/1950 | France | 92/86 |

Primary Examiner—Edward K. Look
Attorney, Agent, or Firm—Nies, Kurz, Bergert & Tamburro

[57] ABSTRACT

Hydraulic fluid leakage collection apparatus that includes an annular collection chamber that is carried in a cylindrical member within which a piston member is movable. A seal and wiper are carried by the clamp cylinder of an injection molding machine to seal the space between the clamp piston and the clamp cylinder and also to wipe from the surface of the clamp piston accumulated hydraulic fluid. Positioned adjacent the wiper ring is a drain passageway that is adapted to receive the hydraulic leakage fluid that is wiped by the wiper ring from the piston. A conduit extends from the drain passageway to an air operated vacuum pump to draw the leakage hydraulic fluid from the drain passageway. A container is positioned in the conduit between the drain passageway and the vacuum pump to collect the hydraulic leakage fluid that is collected.

6 Claims, 5 Drawing Sheets

APPARATUS FOR COLLECTING HYDRAULIC LEAKAGE FLUID

BACKGROUND OF THE INVENTION

1. Field of the Invention

This invention relates to apparatus for collecting hydraulic fluid that leaks past a seal member in a pressurized hydraulic fluid operated device, and more particularly to a vacuum operated leakage recovery arrangement that includes a leakage fluid collector adjacent to the seal and a vacuum pump connected with the collector through a conduit to draw the collected leakage hydraulic fluid to a suitable container to thereby avoid dripping of the leakage fluid onto the machine or onto other surfaces.

2. Description of the Related Art

In hydraulic devices having two relatively movable parts, such as an hydraulic cylinder adapted to slidably receive an inner member in the form of a solid rod or a hollow inner cylinder, flexible seals are typically carried by the interior surface of the cylinder and in surrounding and sealing relationship with the outer surface of the inner member to attempt to prevent the loss of hydraulic fluid between the relatively moving surfaces of the inner member and the cylinder. However, in actual practice, the inner member carries a thin film of hydraulic fluid on its outer surface as it moves outwardly from the cylinder, and when the inner member is once again moved into the cylinder, some of the thin film of hydraulic fluid that has accumulated on the outer surface of the inner member is wiped therefrom, and when sufficient hydraulic fluid has accumulated adjacent to the seal to overcome the surface tension of the fluid, some of the fluid falls by gravity to whatever machine parts might be thereunder, or, most commonly, onto the floor on which the machine is supported.

The leakage of hydraulic fluid is undesirable because it reduces the amount of fluid available for use and it ultimately requires that the reservoir of hydraulic fluid be replenished. Moreover, if the hydraulic device is located above another portion of the machine, the dripping of the hydraulic fluid takes place onto the underlying machine structure, where it could serve to accumulate dust and dirt, and ultimately find its way to the floor beneath the machine. In either case, the leakage of the hydraulic fluid is unsightly and undesirable, and although over the years many different types of seal configurations have been conceived and used in an effor to eliminate fluid leakage, as a practical matter all such seals permit some amount of fluid leakage, and the amount of leakage that occurs generally increases as the machine accumulates hours of use.

It is therefore desirable that some way be found to eliminate the undesirable accumulation of leakage hydraulic fluid, and it is a principal object of the present invention to provide an arrangement that accomplishes that result.

It is another object of the present invention to provide an hydraulic leakage fluid collection system in which fluid collectors are provided adjacent each seal, and conduits are provided to convey the collected hydraulic fluid away from the leakage site to a suitable container.

It is a still further object of the present invention to provide an hydraulic leakage fluid collection device in which an air operated vacuum pump is provided to suck the leakage fluid from adjacent the leakage point to a collection chamber.

SUMMARY OF THE INVENTION

Briefly stated, in accordance with one aspect of the present invention, hydraulic leakage fluid collection apparatus is provided for collecting hydraulic fluid that leaks past a seal that surrounds and engages the outer surface of a rod member that is movable relative to a cylindrical housing. The apparatus includes collection means positioned adjacent to the seal for collecting leakage fluid that is carried by the rod member and that is wiped therefrom as the rod member moves into the cylindrical housing. Continuously operating vacuum pump means provide a reduced pressure level less than atmospheric pressure to draw the leakage fluid from the collection means. The vacuum pump means and the collection means are connected by conduit means that provide a closed communication path between the collection means and the vacuum pump means. Additionally, container means are positioned in the conduit means between the collection means and the vacuum pump means for collecting the leakage fluids that are drawn through the conduit means by the vacuum pump means.

DESCRIPTION OF THE PREFERRED EMBODIMENTS

Figure 1:
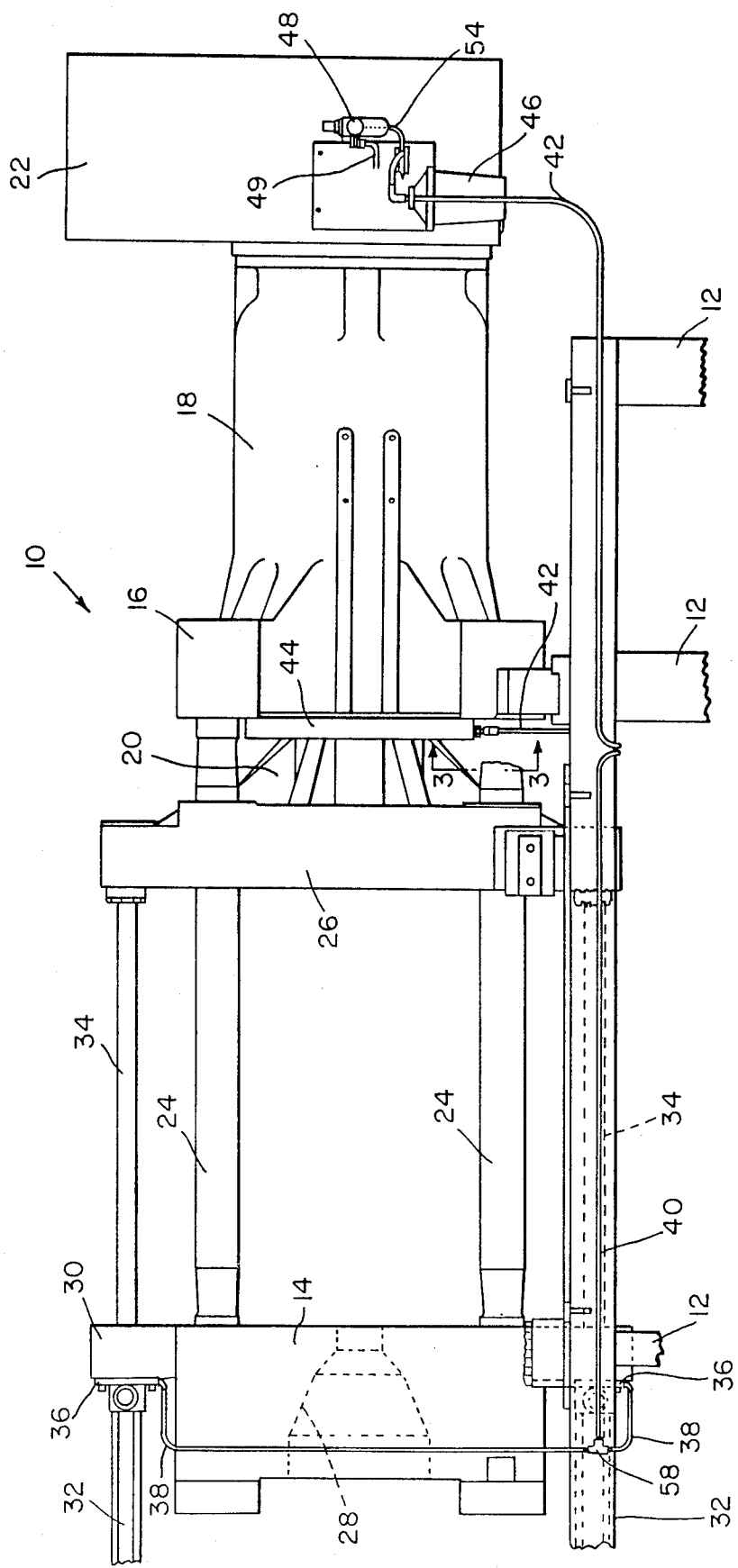
FIG. 1 is a fragmentary side elevational view of the mold clamping portion of a plastic injection molding machine incorporating leakage hydraulic fluid collection apparatus in accordance with the present invention.

Referring now to the drawings, and particularly to FIG. 1 thereof, there is shown the mold clamping section of a plastics injection molding machine 10. Machine 10 is supported on a base frame 12 to which a stationary platen 14 is securely attached in a manner well known to those skilled in the art. Spaced from stationary platen 14 along the base of the machine is a fixed support 16 that is secured to base frame 12 and that supports one end of a large volume hydraulic clamp cylinder 18, within which a clamp piston or ram 20 is slidably carried (see FIGS. 4 through 6) for linear movement in the direction of the axis of clamp cylinder 18. The other end of clamp cylinder 18 carries an hydraulic reservoir 22 for storing hydraulic fluid that can flow into clamp cylinder 18 for purposes of providing a pressure build-up to effect clamping together of a mold (not shown). Extending between fixed support 16 and stationary platen 14 are four guide rods 24, only two of which are visible in FIG. 1. Slidably carried on guide rods 24 is a movable platen 26 that is adapted for movement toward and away from stationary platen 14. Although not shown, for purposes of clarity, stationary platen 14 carries one portion of a mold, and movable platen 26 carries another portion of a mold, the two mold portions together defining a mold cavity having the desired configuration to provide parts of a predetermined shape. Stationary platen 14 includes a recess 28 on one side to receive a plastics materials injection system (not shown).

Stationary platen 14 carries a plurality of support blocks 30, each support block supporting a rapid traverse cylinder 32 so that the traverse rods 34 of traverse cylinders 32 can extend to and be connected with movable platen 26 for rapid traverse of movable platen 26 along guide rods 24 and toward and away from stationary platen 14.

Figure 3:
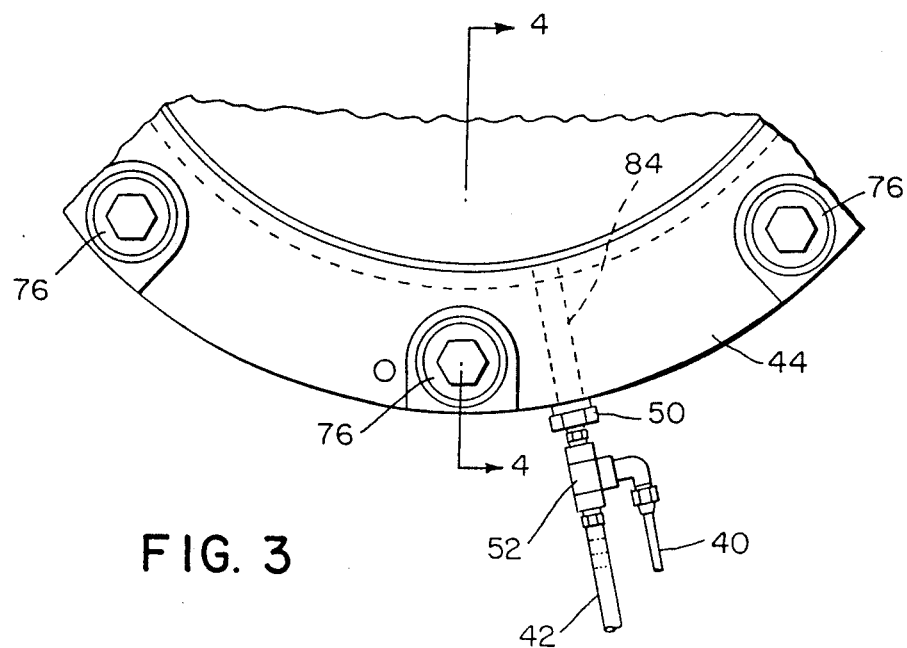
FIG. 3 is an enlarged fragmentary view taken along the line 3—3 of FIG. 1.

Each of traverse cylinders 32 includes a leakage collector housing 36 adjacent a support block 30 and a leakage conduit 38 that extends from collector housing 36 and connects with a larger diameter collection conduit 40 that is connected with a recovery conduit 42 adjacent to seal retaining ring 44 at clamp cylinder 18 (see also FIG. 3). Recovery conduit 42 extends from retaining ring 44 to a recovery container 46, which is in communication with a vacuum pump 48 that is adapted to provide a reduced pressure level, below atmospheric pressure, within the conduits, as will hereinafter be explained in greater detail.

Figure 2:
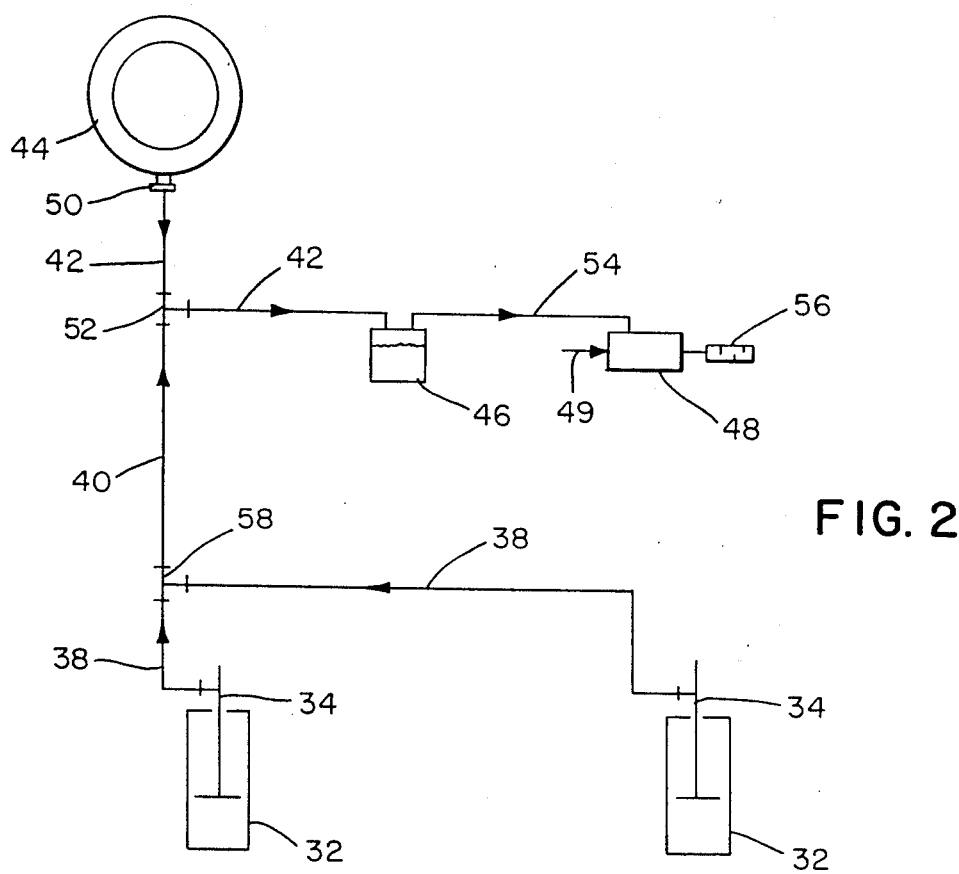
FIG. 2 is a schematic diagram of the leakage hydraulic fluid collection apparatus shown in FIG. 1.

Referring now to FIG. 2, there is shown a schematic view illustrating the pneumatic circuit of the overall leakage collection apparatus shown in FIG. 1. As shown, clamp cylinder seal retaining ring 44 includes a collection fitting 50 (see also FIG. 3) that is positioned adjacent the lowest point of ring 44 and is connected to a tee fitting 52, one end of which is connected with recovery conduit 42 that extends to recovery container 46. An air conduit 54 extends from recovery container 46 to vacuum pump 48, which provides the reduced pressure. Pump 48 receives pressurized air from a source of pressurized air (not shown) through conduit 49 and exhausts the air through a muffler 56 that preferably includes a flow of control valve (not shown), such as a needle valve.

Tee fitting 52 also communicates with collection conduit 40, which extends from fitting 52 to a second, smaller tee fitting 58 (see FIG. 1), two legs of which are connected with leakage conduits 38, which, in turn, are each connected with a respective traverse cylinder leakage collector housing 36 at a point where traverse rod 34 passes into its associated cylinder 32.

Figure 4:
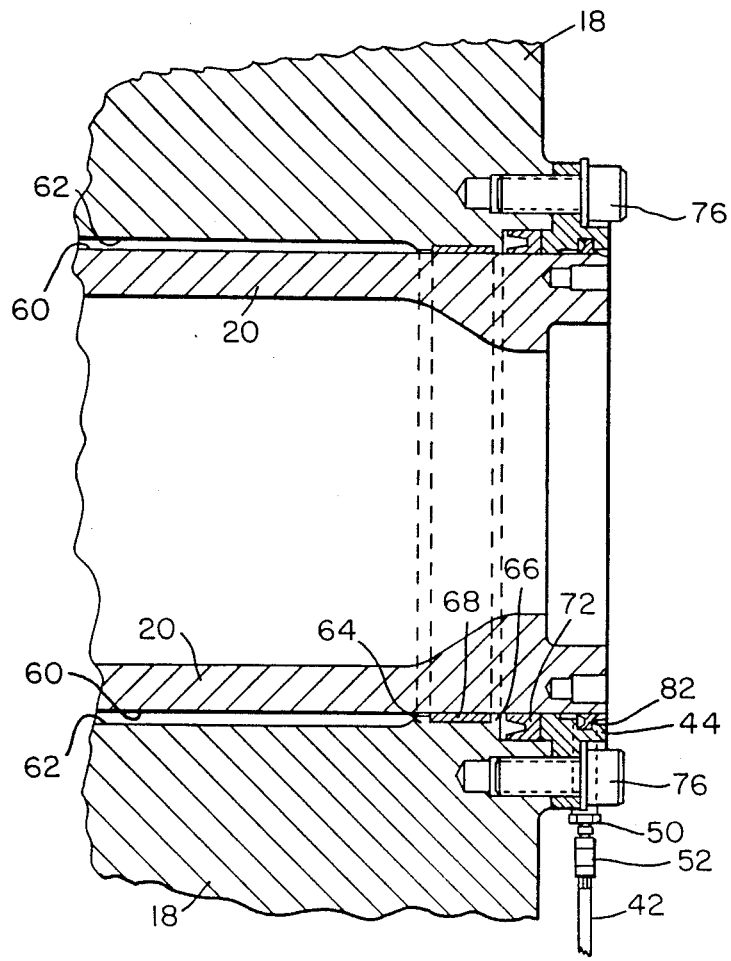
FIG. 4 is a fragmentary cross-sectional view taken along the line 4—4 of FIG. 3 and showing one form of seal arrangement between the clamp cylinder and the clamp piston.

Referring now to FIG. 4, there is shown a portion of clamp cylinder 18, and a portion of clamp piston or ram 20 that is slidably carried by clamp cylinder 18. Ram 20 includes a cylindrical outer surface 60 that is in contact with hydraulic fluid that lies in annular gap defined by the inner surface 62 of clamp cylinder 18 and outer surface 60 of ram 20. Clamp cylinder 18 includes an inner annular land 64 that extends inwardly from inner surface 62 toward outer surface 60 of ram 20, and it also includes an outer annular land 66, that is spaced from inner land 64 to define an annular slot that is adapted to receive an annular rider ring 68 that is intended to slidably support ram 20 as it moves into and out of clamp cylinder 18. Rider ring 68 provides a reduced friction surface, and is of a known structure and material.

Figure 5:
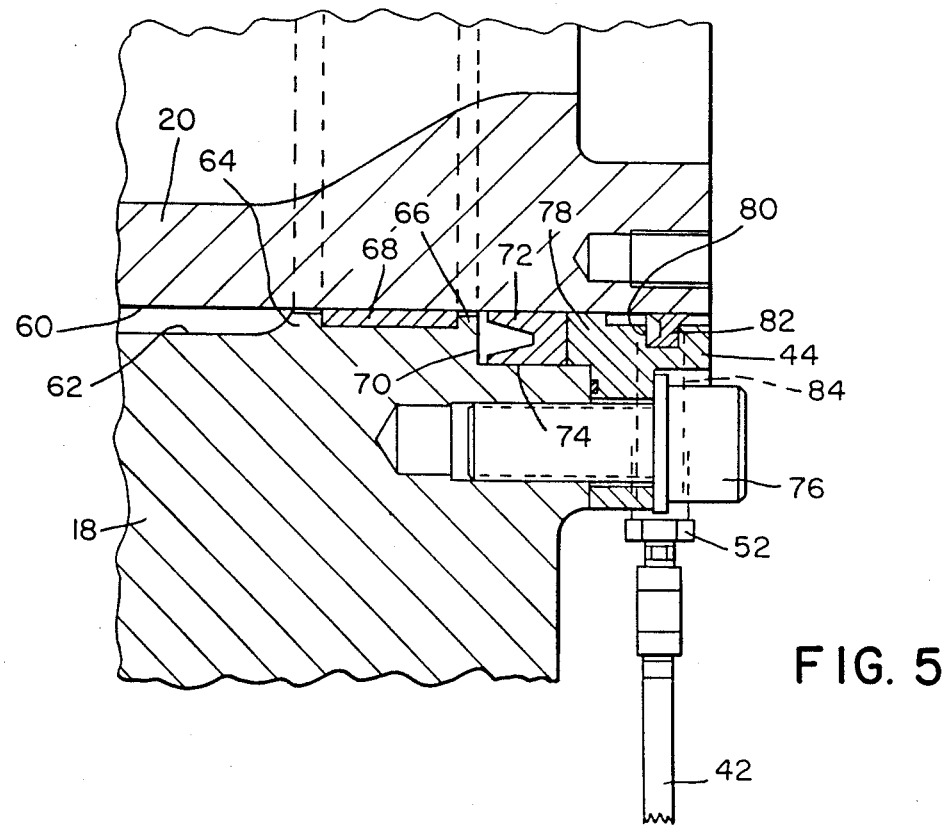
FIG. 5 is an enlarged fragmentary view of the seal structure shown in FIG. 4.

As more clearly seen in FIG. 5, which shows the seal area of the structure illustrated in FIG. 4 in enlarged form, positioned axially outwardly of rider ring 68, relative to the axis of clamp cylinder 18, is a stepped annular recess 70 that is adapted to receive a primary sealing ring 72. As shown, sealing ring 72 is of a generally U-shaped cross section, the outermost surfaces of the legs of the U-being adapted to engage longitudinally extending surface 74 of stepped portion 70 and outer surface 60 of ram 20, respectively. Primary sealing ring 72 is retained in position in annular recess 70 by retaining ring 44 that is of annular configuration and is secured to clamp cylinder 18 by means of a plurality of bolts 76.

Retaining ring 44 includes an inwardly extending stepped portion 78 that is adapted to contact primary sealing ring 72 to hold it in position. Additionally, retaining ring 44 includes an annular recess 80 to receive a secondary sealing ring or wiper ring 82, the purpose of which is to provide a wiping action against outer surface 60 of ram 20 to remove hydraulic fluid that is carried by ram 20 as it moves outwardly relative to the clamp cylinder. Wiper ring 82 as shown is of a generally L-shaped construction and includes a pair of opposed, outwardly extending wiping edges that ride against ram surface 60.

Positioned within retaining ring 44 and adjacent to the lowermost portion of annular recess 80 is a leakage flow conduit 84 that has a diameter greater than the axial length of recess 80 so that hydraulic fluid that is wiped from ram surface 60 by either of the wiping edges of wiper ring 82 flows radially outwardly along the wiping edges and then flows along annular recess 80 by gravity down toward leakage flow conduit 84. Conduit 84 is in communication with the recovery conduit 42 through tee-fitting 50. Preferably, conduit 84 is positioned adjacent the lowermost portion of annular recess 80, to avoid overflow of leakage fluid from the recess. In the embodiment shown in FIG. 4, conduit 84 is slightly offset from the lowermost portion of the recess in order not to interfere with bolt 76. However, if bolt 76 were slightly offset from the vertical plane that passes through the axis of retaining ring 44, then preferably conduit 84 is placed at the lowermost point of recess 80.

Vacuum pump 48 shown in FIG. 1 and illustrated schematically in FIG. 2 can be any convenient type of vacuum pump, but the preferred pump structure utilized in the present arrangement is a continuously operating, air-operated vacuum pump that is in the form of a plurality of serially arranged venturis to provide a steady, reduced pressure level lower than atmospheric pressure. The preferred pump operates as an ejector-type pump by providing a reduced static pressure zone adjacent the several venturis, the reduced pressure zone communicating with a connector carried by the pump body for connection with a suitable conduit. One type of such a pump is manufactured by PIAB USA, Inc. of Hingham, Mass. The PIAB vacuum pump operates with a continuous, low volume air flow, and provides sufficient continuous vacuum to draw the leakage fluid from the respective collection points to recovery container 46, to thereby avoid dripping of the leakage hydraulic fluid either on the floor, on other portions of the injection molding machine, on articles molded by the machine, or on other apparatus used with the machine, such as conveyors for conveying molded products made by the injection molding machine, or the like.

Figure 6:
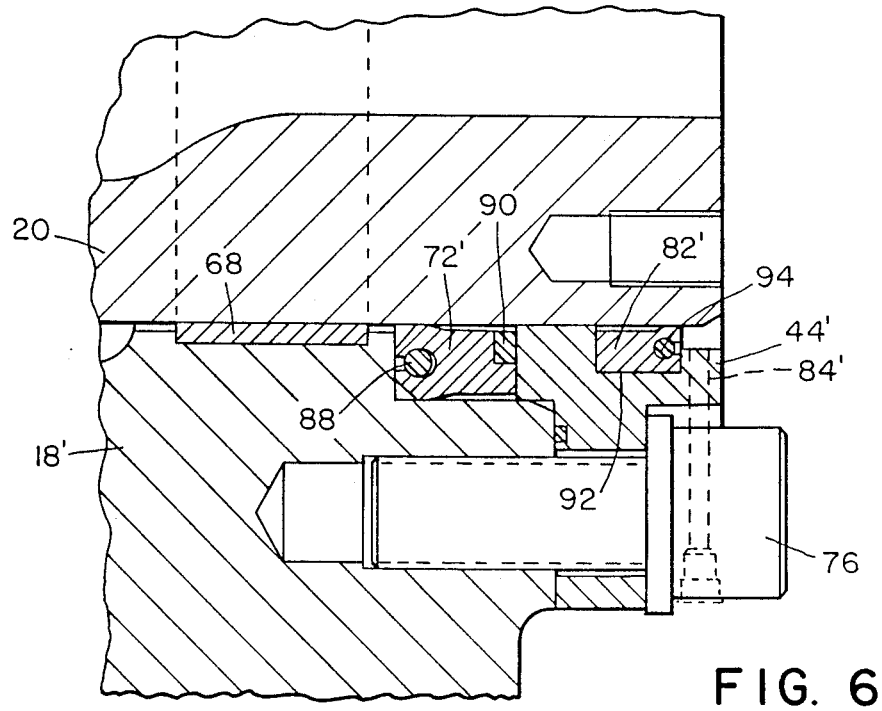
FIG. 6 is an enlarged fragmentary view showing another form of seal structure.

Another form of seal arrangement is illustrated in FIG. 6, in which the structure of the parts of the machine is generally similar to that shown in FIGS. 4 and 5, except that the primary, U-shaped sealing ring 72' includes an inner expander member 88 that is positioned between the legs of the U. Expander member 88 can be an O-ring, for example, to urge ring 72' into tighter contact with outer surface 60 of ram 20. Expander member 88 operates as a resilient spring, and preferably is of higher durometer than the material from which primary seal 72' is made. The FIG. 6 embodiment also includes an O-ring 90 positioned between seal retaining ring 44' and outer surface 60 of ram 20 for additional sealing effect.

Retaining ring 44' also includes an inner, annular recess 92 that carries a wiper ring 82' that also includes an inner expander member 94, that can be a O-ring such as O-ring 88 provided in primary seal 72'. Conduit 84' extends through retaining ring 44' from adjacent the outermost surface of wiper ring 82' to collect and recover any leakage hydraulic fluid that is wiped from the outer surface of ram 20 by wiper ring 82'.

Although many different types of seal structures can be employed, the seal structures illustrated in FIGS. 4 and 5 are available from the A. W. Chesterton Company, of Stoneham, Mass. Similarly, the sealing elements illustrated in FIG. 6, which have been found to provide somewhat improved sealing over the seals illustrated in FIGS. 4 and 5, are available from Greene Tweed & Co., of North Wales, Pa.

Figure 7:
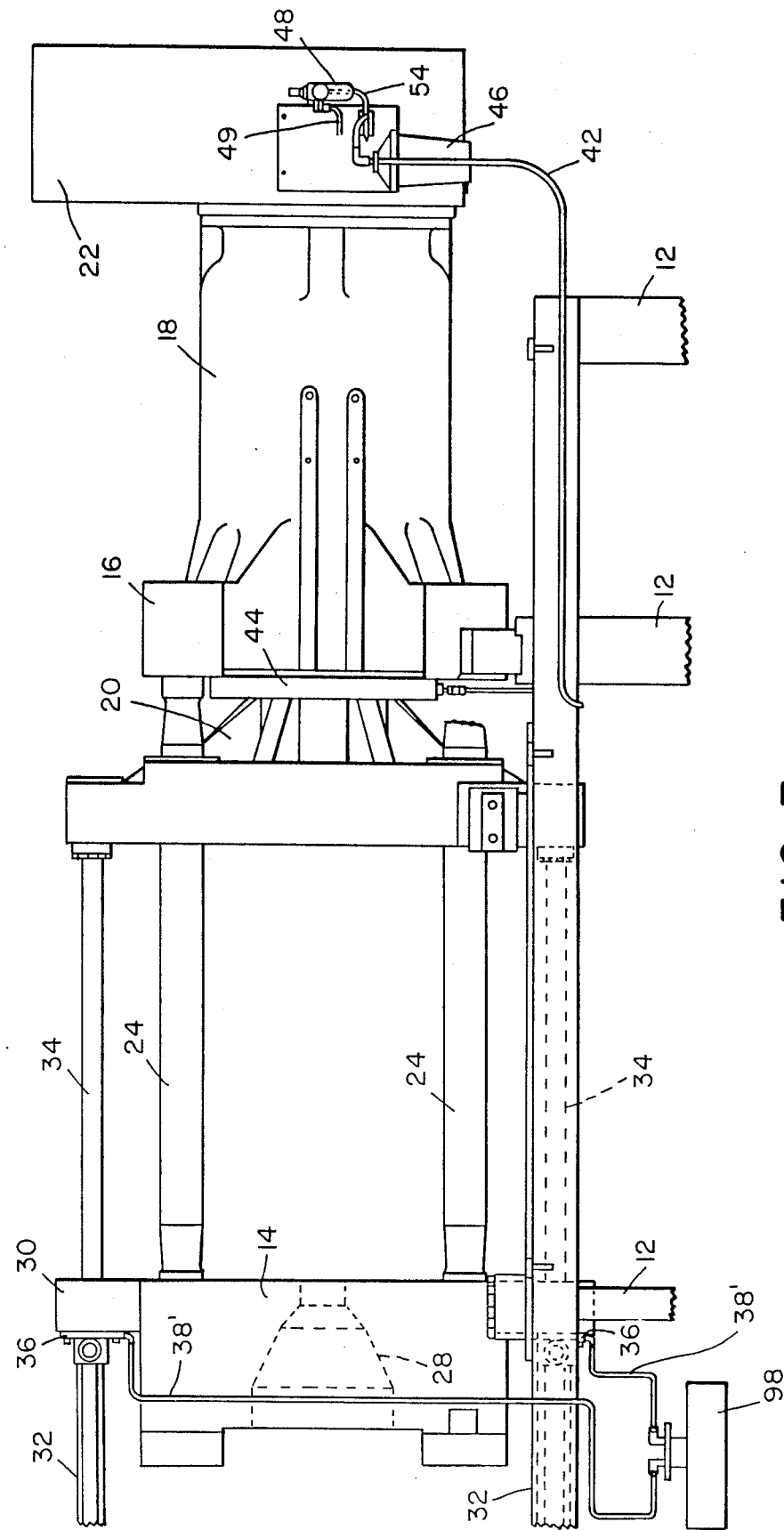
FIG. 7 is a fragmentary side elevational view similar to that of FIG. 1, showing another form of leakage fluid collection arrangement.

The embodiment illustrated in FIG. 7 is similar to that of FIG. 1, except that the leakage conduits 38' from the traverse cylinders extend directly to hydraulic reservoir 98, which is located below stationary platen 14, to convey leakage fluid from the traverse cylinders to the reservoir by gravity flow. Leakage hydraulic fluid from clamp cylinder 18 and ram 20 is collected by the apparatus and vacuum system hereinabove disclosed.

In operation, a source of pressurized air (not shown) is connected with the air inlet of vacuum pump 48, and by virtue of the venturi action of the pump a reduced pressure zone is created within the pump, and that zone is in communication with air conduit 54 that extends from pump 48 to recovery container 46. Air conduit 54 does not extend into the hydraulic fluid within recovery container 46, nor does recovery conduit 42, and the reduced pressure level provided by vacuum pump 48 is communicated to the several leakage fluid collection points at the respective hydraulic cylinders suck up the leakage hydraulic fluid. When recovery container 46 has been filled, it can be removed and the contents replaced in the main hydraulic reservoir (not shown), so that the collected hydraulic fluid can be reused, if desired.

The present invention provides a simple and economical way of recovering hydraulic leakage fluid from pressure piston cylinders of a machine such as an injection molding machine. Further, although an injection molding machine is illustrated herein, it will be apparent to those skilled in the art that the present invention can be applied to any other types of machines that involve hydraulic components that can provide leakage points.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Hydraulic fluid collection apparatus for collecting hydraulic fluid that leaks past an annular seal surrounding and engaging the surface of a rod member that is movable relative to a cylindrical housing, said apparatus comprising:

a. collection means carried by a cylindrical housing and positioned externally of and adjacent to an outlet of the housing, the housing outlet slidably receiving a rod member having an axis extending substantially horizontally, the collection means including a drain conduit having an opening exposed to atmospheric pressure and positioned externally of the housing and below the rod member for collecting hydraulic leakage fluid that passes between the rod member and the housing and around the annular seal, wherein the collection means further includes an annular collection groove defined between the rod member and the cylindrical housing adjacent to the housing outlet through which the rod member passes, the collection groove including a surface extending axially outwardly of the drain conduit, the surface being entirely spaced from the rod member so that the groove is open to the surrounding atmosphere and is in surrounding relationship with the rod member, wherein the drain conduit opening is positioned adjacent to and axially outwardly of the annular seal and adjacent the lowermost portion of the groove for receiving leakage fluid that is carried by the rod member outwardly of the housing;
   b. vacuum pump means connected with the collection means for providing a reduced pressure level below atmospheric pressure to draw leakage hydraulic fluid away from the collection groove;
   c. conduit means providing communication between the drain conduit opening and the vacuum pump means; and
   d. container means positioned in the conduit means between the collection means and the vacuum pump means for receiving and retaining hydraulic leakage flud that is drawn from the collection means by the vacuum pump means.

2. Hydraulic cylinder and piston apparatus comprising:

(a) housing means adapted to contain hydraulic fluid under pressure, the housing means including a piston-receiving opening and fluid inlet and outlet means to admit and release pressurized fluid to and from the housing;
   (b) piston means movably carried by the housing means and slidable into and out of the housing means through the piston-receiving opening in the housing means, the piston means movable relative to the housing means by selectively admitting and releasing from the housing means pressurized hydraulic fluid that acts the piston means;
   (c) flexible sealing means carried by the housing means adjacent the piston-receiving opening for sealing engagement with the housing and with the piston means for limiting leakage of hydraulic fluid between the housing means and the piston means;
   (d) seal retaining means carried by the housing means for retaining the sealing means in position relative to the housing means and for collecting leakage hydraulic fluid, wherein the seal retaining means includes an annular, inwardly facing leakage fluid collection groove in surrounding relationship with the piston means;

(e) drainage conduit means carried by the retaining means outwardly of the sealing means for receiving hydraulic fluid that is carried by the piston means past the sealing means, the drainage conduit means positioned to receive leakage hydraulic fluid; and (f) wiper means carried in the leakage fluid collection groove and in wiping engagement with the rod means, wherein the drainage conduit means has an axial dimension greater than a corresponding axial dimension of the leakage fluid collection groove to define a drain aperture that extends axially beyond the collection groove in each axial direction to receive leakage fluid from both axially spaced sides of the wiper means.

3. Hydraulic cylinder piston apparatus in accordance with claim 2, including conveying means connected with the drainage conduit means for conveying leakage hydraulic fluid away from the seal retaining means.

4. Hydraulic cylinder and piston apparatus in accordance with claim 3, wherein the conveying means includes vacuum means for imposing a pressure less than atmospheric pressure at the drainage conduit means for drawing leakage hydraulic fluid away from the seal retaining means.

5. Hydraulic cylinder and piston apparatus in accordance with claim 4, wherein the vacuum means includes a continuously operating vacuum pump that pump that provides a constant reduced pressure level for continuous withdrawal of leakage fluid from the collection groove.

6. Hydraulic cylinder and piston apparatus in accordance with claim 2, wherein the axis of the collection groove is substantially horizontally disposed and the drainage conduit means is positioned adjacent the lowermost portion of the collection groove.

* * * * *